(12) United States Patent
Bächtle et al.

(10) Patent No.: US 7,591,717 B2
(45) Date of Patent: Sep. 22, 2009

(54) DEVICE AND METHOD FOR MANUFACTURING SAUSAGES

(75) Inventors: Manfred Bächtle, Schemmerhofen (DE); Siegfried Reutter, Eberhardzell (DE); Markus Schliesser, Wain (DE)

(73) Assignee: Albert Handtmann Maschinenf Abrik GmbH & Co. KG, Biberach (DE)

( * ) Notice: Subject to any disclaimer, the term of this patent is extended or adjusted under 35 U.S.C. 154(b) by 0 days.

(21) Appl. No.: 12/147,152

(22) Filed: Jun. 26, 2008

(65) Prior Publication Data

US 2009/0023373 A1  Jan. 22, 2009

(30) Foreign Application Priority Data

Jul. 20, 2007 (EP) ................... 07014354

(51) Int. Cl.
*A22C 11/00* (2006.01)
(52) U.S. Cl. ...................................... 452/30
(58) Field of Classification Search ........................ None
See application file for complete search history.

(56) References Cited

U.S. PATENT DOCUMENTS

| 3,751,202 | A | | 8/1973 | Coleman et al |
| 4,307,489 | A | * | 12/1981 | Niedecker .................... 452/32 |
| 4,486,163 | A | | 12/1984 | Pfeilstetter |
| 4,949,430 | A | * | 8/1990 | Stanek ......................... 99/494 |
| 6,632,466 | B2 | | 10/2003 | Roussel et al. |
| 6,740,349 | B2 | * | 5/2004 | Franklin et al. ............. 426/513 |
| 6,988,943 | B2 | | 1/2006 | Reutter et al. |

FOREIGN PATENT DOCUMENTS

| EP | 0 071 183 A2 | 7/1982 |
| EP | 0071183 | 2/1983 |
| EP | 1 114 587 A1 | 7/2001 |
| EP | 1114587 | 7/2001 |
| EP | 1 371 293 A1 | 12/2003 |
| EP | 1371293 | 12/2003 |
| WO | WO-2005/084447 | 9/2005 |
| WO | WO 2005-084447 A1 | 9/2005 |

OTHER PUBLICATIONS

European Search Report based on European Patent No. EP 07 01 4354.
European Search Report for EP 07014354 mailed Dec. 21, 2007.

* cited by examiner

*Primary Examiner*—Thomas Price
(74) *Attorney, Agent, or Firm*—Marshall, Gerstein & Borun LLP

(57) ABSTRACT

A device and a method for the manufacture of sausages from paste mass, in particular sausage meat, with a coextrusion head for coextruding the paste mass and a sausage casing, wherein the coextrusion head comprises a filling tube for the ejection of the paste mass as well as an extrusion die assigned to the filling tube with an extrusion gap for ejecting the easing material. In order to produce strong sausage casings, the filling tube protrudes by a distance X beyond the annular gap so that the casing material is extruded through the annular gap onto the filling tube and solidifies along the filling tube.

18 Claims, 5 Drawing Sheets

DEVICE AND METHOD FOR MANUFACTURING SAUSAGES

CROSS-REFERENCE TO RELATED APPLICATION

The present application claims the benefit of priority of European Patent Application No. 07 014 354.0, filed Jul. 20, 2007. The entire text of the priority application is incorporated herein by reference in its entirety.

FIELD OF THE DISCLOSURE

The present disclosure relates to a device and a method for the manufacture of sausages, and more particularly, to a coextrusion head and die for coextruding sausage paste mass and sausage casing.

BACKGROUND

Devices and methods of this nature are already known from EP 1 371 293. Here a sausage casing film is pulled over a paste mass (sausage meat) and then following the coextrusion process the produced sausage skein is portioned off. A coextrusion head of this nature is for example illustrated in the present FIG. 5. The sausage casing mass is applied to the paste mass fed through the filling tube 2 via the annular gap 4 by an extrusion die 7. After the coextrusion the sausage casing, which is fed as a gel-type mass (e.g. alginate) through the annular gap 4, is solidified by feeding a fixing solution externally, e.g. calcium chloride solution, and made ready for the following processing steps, such as for example constriction or twisting off.

However, since the solidification process takes a certain time, typically 1 to 2 seconds until the casing can be stressed, constricting the sausage skein directly following the coextrusion head presents a problem, for example, in order to initiate a twisting-off process. The sausage casing is not sufficiently strong for this, so that the sausage skein tears.

SUMMARY OF THE DISCLOSURE

Based on this, the object of the disclosure is to provide a simple device and a fast method for the manufacture of sausages, which facilitate the manufacture of a sausage casing that can be more highly stressed.

According to the present disclosure the sausage casing is no longer applied directly to the paste mass ejected from the filling tube, but instead it is extruded onto the filling tube. To facilitate this the filling tube protrudes a distance X beyond the annular gap. The extruded casing material can then solidify on the distance X of the protruding filling tube. Thus a continuous sausage casing, can be produced on the filling tube. The paste mass is then fed to it. Here the sausage casing on the filling tube is drawn off the filling tube. The casing can thus be stressed and the following processing steps, such as for example constriction, twisting off, displacement, etc., carried out. The distance X of the extended filling tube here therefore also serves as a buffer section to provide a reserve of sausage casing directly on the filling tube.

In an advantageous way the device has an arrangement for feeding fixing solution for the ejected case material, wherein the device is at least arranged in a partial region of the distance X, in particular at the start of the distance X. Thus, reliable and quick fixing is ensured in the region of the distance X. Preferably the distance X is greater or equal to 10 to 200 mm, but can also be longer. A distance of this nature is sufficient to solidify the casing material.

In order that the extruded casing material, i.e. the produced sausage casing, can move on the filling tube in the direction of the filling tube end, it is advantageous if the filling tube has a filling tube surface which, at least in the region of the protruding distance X, has a low sliding friction coefficient $\mu$ lower than that of polished stainless steel (e.g. in a range from 0.01 to 0.1). It is thus ensured that the sausage casing can easily move on the filling tube without tearing or becoming damaged. Favorable sliding properties of this nature can for example be achieved through an appropriate coating.

It is however also possible that the device in addition or alternatively comprises a lubricating device for feeding a lubricant between the filling tube and the ejected casing material. In this way, since a lubricant is produced between the filling tube and sausage casing, the sausage casing does not adhere to the filling tube and does not tear. Thus, the sliding friction coefficient can be minimized.

According to a preferred embodiment the lubricating device has a feed for lubricant, which is arranged in the filling tube, as well as an annular gap through which the lubricant is ejected onto the surface of the filling tube which protrudes by the distance X.

In the end section of the filling tube at least one opening of a return channel can then be provided for the lubricant in order to drain off the lubricant such that no or very little lubricant is introduced between the sausage casing and paste mass. Alternatively, the outside of the filling tube can also be provided with return grooves at least in the region of the distance X. Thus, excess lubricant can be drained off.

It can also be advantageous if in the region of the filling tube end an annular stripping element is arranged around the filling tube which exerts a pressure on the sausage casing. Thus, the emission of lubricant over the filling tube end between the paste mass and the sausage casing can be prevented. The retained lubricant can then be led off via the previously mentioned return channels or grooves.

With the method according to the disclosure, following the filling tube the filled sausage casing can be divided by a twist-off process or constriction into single portions. This means that the filled sausage skein can be rotated about its longitudinal axis to produce a twist-off point or displacement elements can divide up the sausage casing into single portions without the sausage casing being damaged.

The fixing solution can be applied externally via the fixing solution feed to the extruded casing material at least in the starting region of the distance X. If a lubricant is used and it is injected between the filling tube and the casing material, this lubricant can also have solidifying properties so that at the same time solidification can occur from the inside. Thus, it is possible to solidify the sausage casing from the inside and outside in order to more quickly strengthen it for the following treatment process.

When the lubricant is introduced between the filling tube and casing material and the lubricant is introduced further between the sausage casing and paste mass, easy movement of the paste mass relative to the sausage casing occurs due to the lack of binding between the paste mass and the sausage casing. This can be helpful with the following processes, such as for example the packaging of the products, or also for the case in that simple removal (easy peeling away of the casing) is desired.

If no lubricant is required between the sausage casing and paste mass, then the lubricant is led away in the end section of the filling tube.

BRIEF DESCRIPTION OF THE DRAWINGS

The disclosure is explained in more detail below with reference to the following drawings.

DETAILED DESCRIPTION

Figure 1:
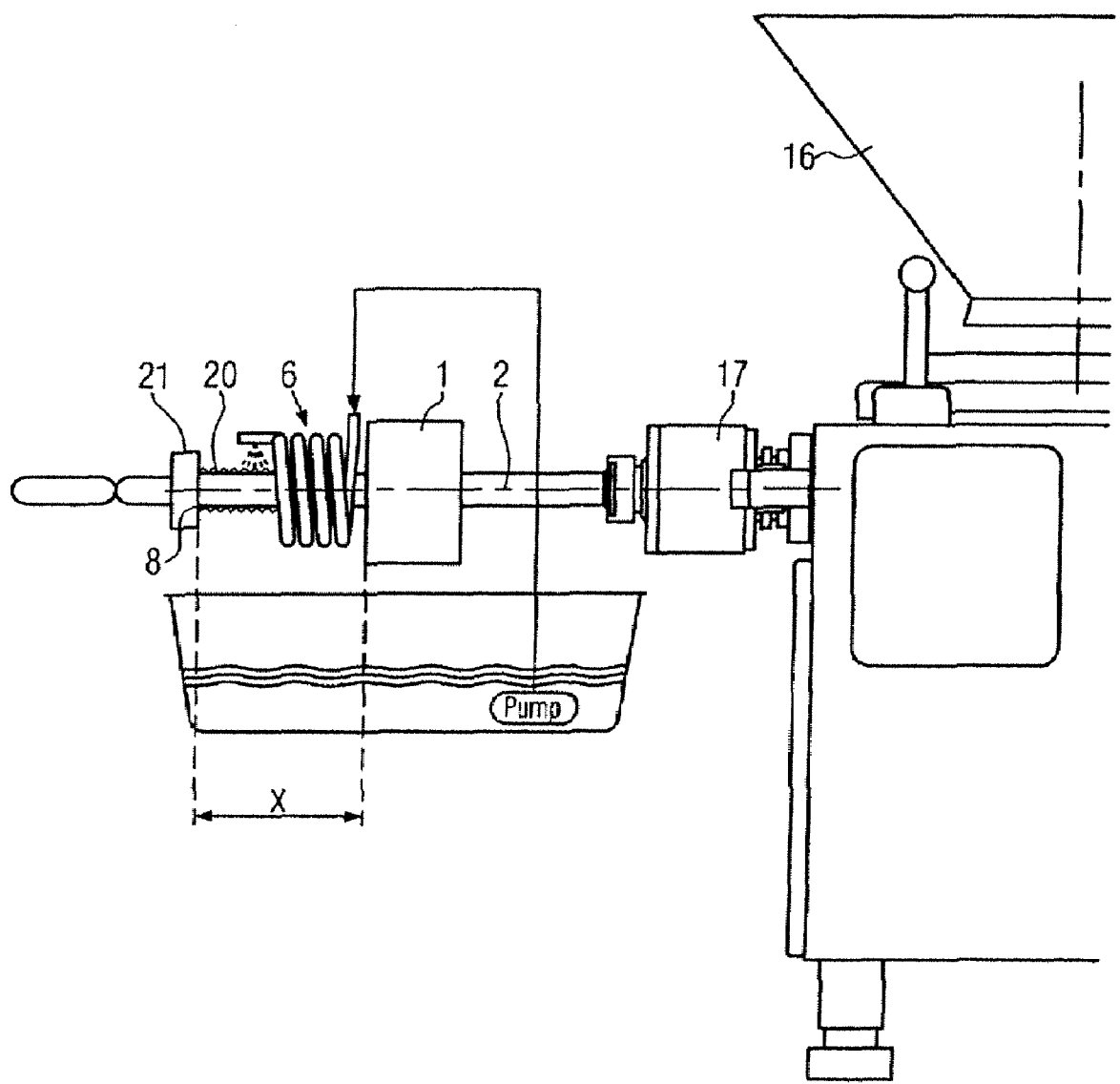
FIG. 1 illustrates a filling machine according to the present disclosure.

As emerges from FIG. 1, a filling machine comprises in a known manner a hopper 16, through which a paste mass, such as for example sausage meat, is fed to a conveying mechanism positioned below the hopper. The conveying mechanism brings the paste mass under pressure into a filling tube 2, so that it is pushed into a sausage casing for the production of sausages. With the aid of the coextrusion head 1 the sausage casing 20 can also be produced for the sausages. For the solidification of the casing material a device 6 is also provided for feeding fixing solution for the ejected casing material. Here, the device is formed as an annular spray through which the sausage casing to be solidified is passed on the filling tube. The annular spray is connected to a feed for a fixing solution which is fed by means of a pump from a further storage container for the annular spray.

After the filling tube end 8 various devices 21 can be arranged to follow, as illustrated schematically in FIG. 1. For example, here a parting-off device can be provided, which parts off the produced sausage skein when it is, for example, twisted about the longitudinal axis A with the aid of the drive 17. A parting-off device, which for example parts the paste mass for dividing the sausage skein into single sausages using a displacement element, and/or a conveying device, which conveys the produced sausage skein or the single sausages further in the transport direction T, can also be arranged after the filling tube. These various devices will however not be discussed further here.

Figure 2:
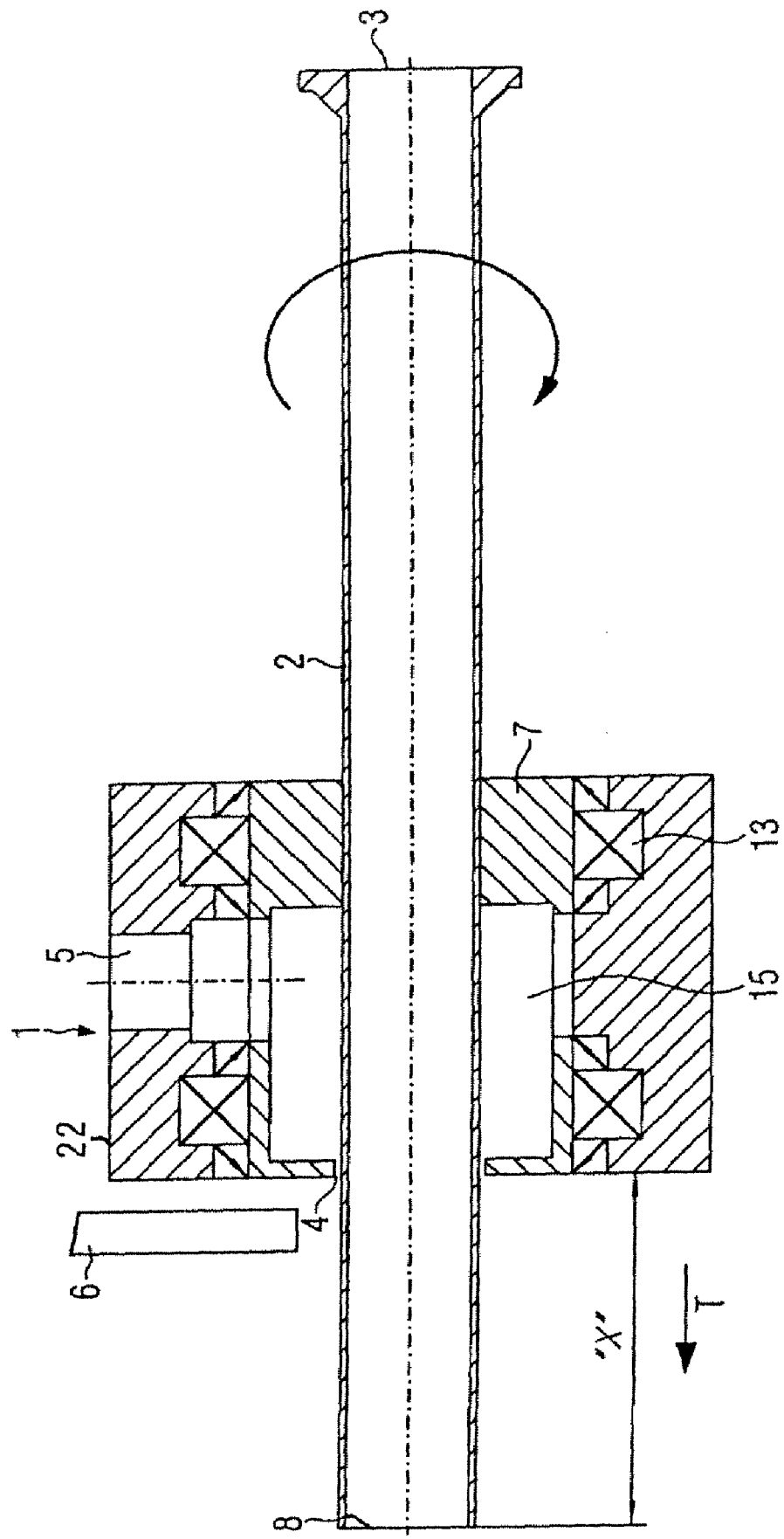
FIG. 2 illustrates a cross-section through a coextrusion head according to a first embodiment of the present disclosure.

FIG. 2 illustrates a cross-section through a first embodiment according to the present disclosure. As emerges from FIG. 2, the coextrusion head 1 comprises a housing 22, in which the extrusion die 7 is pivotably supported by appropriate bearings 13 for the ejection of casing material. The housing 22 has a feed 5 for the casing mass material. The extrusion die 7 comprises a die cavity 15 through which the casing material can be extruded via the annular gap 4 onto the filling tube 2. The filling tube 2 extends through the extrusion die 7. Together with the extrusion die, the filling tube 2 is pivotably supported about the longitudinal axis of the filling tube, as indicated by the arrow in FIG. 2, and can be rotated for a parting-off process for parting off a produced sausage skein. The coextrusion head 1 here has a filling tube 2 extended beyond the annular gap 4. The filling tube 2 protrudes by a distance X beyond the annular gap 4. The distance X is preferably 10 to 200 mm long, but can also be selected longer.

Thus, the casing material can be extruded through the annular gap 4 onto the filling tube 2, wherein the casing material can be solidified on the distance X. The extruded casing material here moves in the direction of the filling tube end 8 in the transport direction T. For hardening a device is provided here for feeding fixing solution 6, which is preferably arranged around the filling tube as illustrated in FIG. 1, and applies the fixing solution externally to the ejected casing material. Thus, the casing material, for example alginate, can solidify through application of, for example, a fixing solution (e.g. calcium chloride solution).

Due to the extended sleeve, i.e. the extended filling tube, the hardening time can thus effectively be prolonged to more than 1 s. At the end 8 of the filling tube 2, the ejected casing material is sufficiently solidified and can be passed to the following processing stages. The paste mass, which has been fed under pressure via the feed 3 to the filling tube, is only now ejected. Here, the paste mass is pushed into the sausage casing 20, by means of which the sausage casing 20 is pulled off the filling tube 2, so that the sausage casing or the ejected casing material is moved in the transport direction T. Thus the ejected casing material or the sausage casing can be advantageously easily moved in the transport direction T if the filling tube 2 has good sliding properties in the external region. Preferably, the surface of the filling tube is at least formed in the region of the distance X such that it has a sliding friction coefficient $\mu$ in a range from 0.01 to 0.1. This can, for example, occur in that a coating to reduce the sliding friction has been applied at least in the region X of the filling tube 2. Thus, according to the present disclosure, a strong solidified sausage casing 20, which withstands the following processing stages, can be made available already at the end of the filling tube 2. Thus, it is possible for example to carry out constriction and twisting off directly following the filling tube 2, e.g. using a twist-off device 21, 17, wherein the sausage casing is twisted together with the filling tube 2 and the extrusion die 7 about the longitudinal axis by the drive 17, while the filled sausage skein is held by the device 21 against twisting so that a constriction can be produced. Division is also possible by displacing the paste mass in the filled sausage skein, for example by displacement arms or shears, etc. It is also possible to use the distance X as a buffer section in order to make a sausage casing available as reserve directly on the filling tube. Then the distance X is chosen to be appropriately longer. The disclosure thus facilitates the manufacture of a continuous sausage casing so that continuous processing is feasible.

Figure 3:
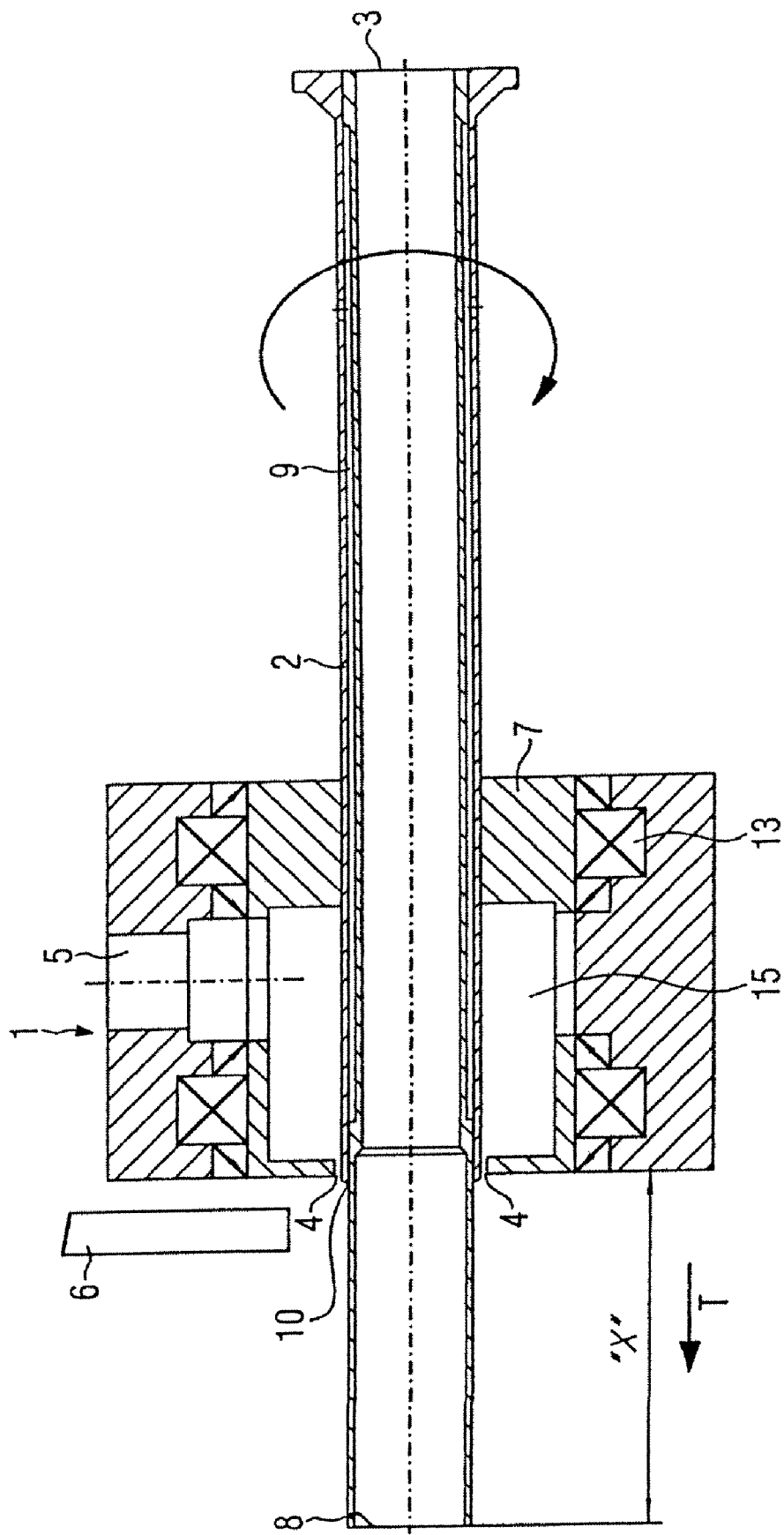
FIG. 3 illustrates a cross-section through a coextrusion head according to a second embodiment of the present disclosure.

FIG. 3 illustrates a cross-section through a second embodiment according to the present disclosure. If the coefficient of sliding friction between the filling tube and the ejected casing material or the sausage casing to be manufactured is to be minimize, then in addition a lubricant, such as for example water, can be added. The embodiment illustrated in FIG. 3 corresponds to the embodiment illustrated in FIG. 2 with the exception that here also a lubricating device is provided for feeding a lubricant. The lubricating device comprises a feed 9 for the lubricant. The feed 9 here is formed as a channel in the filling tube 2. In particular the channel here runs in an annular shape in the wall of the filling tube. In the region of the annular gap 4 a further annular gap 10 is arranged here around the outer surface of the filling tube 2. For this, the filling tube 2 in the region behind the further annular gap 10 has a smaller diameter than the filling tube 2 in a region in front of the annular gap 10. Internal injection of the lubricant can occur via the annular gap 10 between the ejected casing material and the surface of the filling tube 2. Thus, the ejected casing material, i.e. the sausage casing to be produced, can easily slide on the filling tube 2 in the direction of the filling tube end 8. The injection of the lubricant therefore acts as an aid to reduce the coefficient of friction on the surface of the filling tube. For this purpose, additional openings can be arranged along the distance X through which additional lubricants can be injected, so that the sliding film cannot tear along the distance X. The lubricant is then with the ejection of the paste mass introduced through the filling tube 2 into the sausage casing 20, also between the sausage casing 20 and the paste mass. This facilitates easy movement of the paste mass relative to the sausage casing 20 due to the lack of binding between the inner mass and the sausage casing. This can be helpful with the following processes, such as for example the packaging of the products or also for the case in that simple removal (easy peeling) of the casing is desired.

It is advantageous if the lubricant also has solidifying properties for the sausage casing. Thus, it is possible to solidify the sausage casing, which is to be produced, from the inside and outside in order to more quickly strengthen it for the following treatment process.

Figure 4:
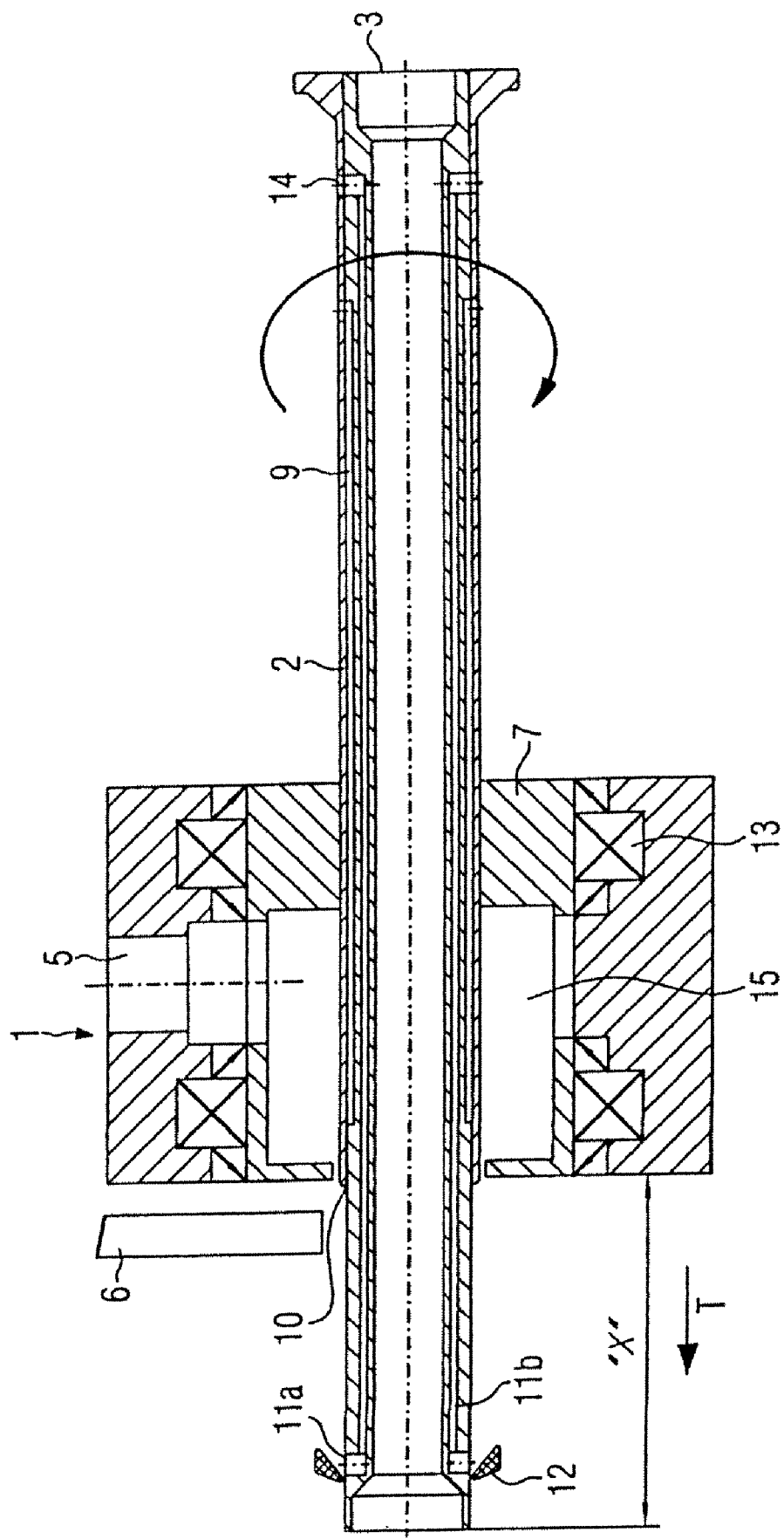
FIG. 4 illustrates a cross-section through a third embodiment according to the present disclosure.
Figure 5:
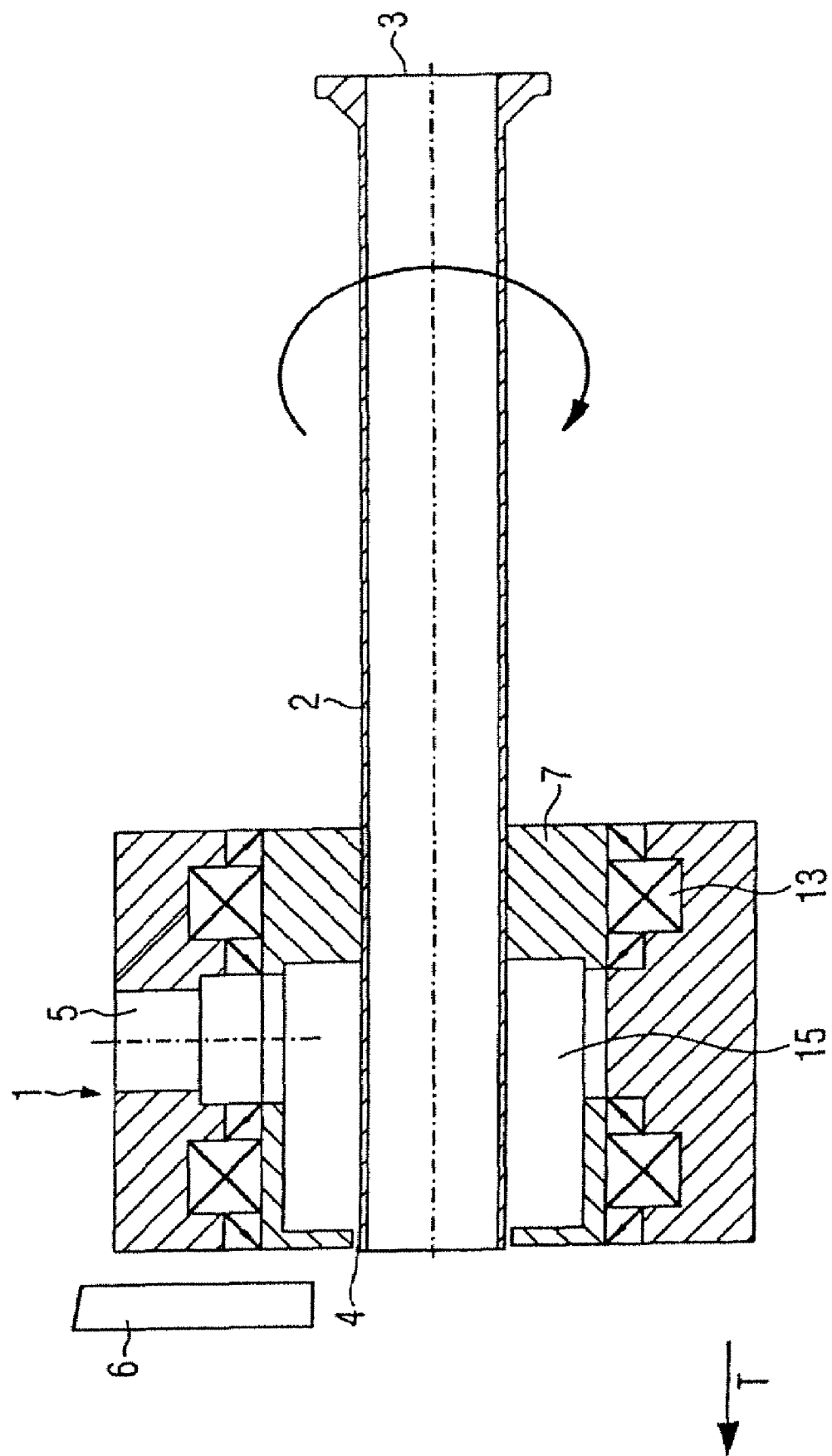
FIG. 5 illustrates a cross-section through a coextrusion head as is known from the state of the art.

FIG. 4 illustrates a cross-section through a third embodiment according to the present disclosure. The embodiment illustrated in FIG. 4 corresponds here essentially to the embodiment illustrated in FIG. 3. It is not in all cases desirable that the lubricant is introduced between the paste mass and the sausage casing as with the second embodiment. For this, a device can be provided according to the present disclosure which returns the lubricant in the end section of the filling tube 2 such that no or only very little lubricant comes between the sausage casing and the ejected paste mass. As emerges from FIG. 4, at least one opening can be provided for this in the end section of the filling tube 2, for example an annular opening 11a, which is connected to at least one return channel 11b. The at least one return channel 11b can also be arranged, for example in an annular shape, in the filling tube 2. The lubricant can be fed back again via this channel or the channels 11b through the drain opening 14 in the filling tube 2 to the lubricant supply in order to be reused. In order that the lubricant can be better drained via the opening 11a in the filling tube, an annular shaped stripping element 12 is arranged around the filling tube 2 which exerts a pressure on the sausage casing 20. The stripping element 12 is formed from elastic material and here has a wedge-shaped cross-section with only the tip pressing on the sausage casing. Thus, the flow of lubricant can be stopped and diverted into the opening 11a.

Alternatively to the device illustrated in FIG. 4 for diverting or returning the lubricant it would also be conceivable to provide the outer side of the filling tube 2 with return grooves. The lubricant can then be collected up by the stripping element 12 and diverted into the return grooves against the transport direction T.

In the following the method according to the disclosure is explained in more detail with reference to FIGS. 2 to 4. To manufacture sausages, as previously described, casing material, which is fed to the extrusion die 7 via the feed 5, is ejected via the annular gap 4 onto the surface of the filling tube 2. At least in the starting region of the distance X of the filling tube 2 protruding beyond the annular gap 4, fixing solution is applied to the surface of the ejected casing material by a device 6. The casing material slides in the transport direction T over the surface of the filling tube and hardens off up to the end 8 of the filling tube so that the sausage casing 20 produced can be subjected to the following treatment stages. Paste mass arrives at the filling tube end 8 via the filling tube 2 and the feed 3 and here fills the sausage casing 20 previously produced. When the paste mass is ejected, the casing material 20 is simultaneously pulled from the filling tube 2, as is also the case for example in the manufacture of sausages where the sausage casing is gathered up on the filling tube. Thus, according to the present disclosure a continuous sausage casing, i.e. an "endless" sausage casing, can be produced which facilitates a continuous process. Since the produced sausage casing 20 is already substantially solidified at the end 8 of the filling tube, constriction or twisting off of the filled sausage skein can occur directly after the filling tube. During twisting off, the filling tube 2 is rotated together with the extrusion die 7 about the longitudinal axis of the filling tube, for example using a drive 17, while the filled sausage skein can be held against twisting by the device 21. Thus a constriction point is produced between single portions. Alternatively, the filled sausage skein can also be divided up by displacing the paste mass in the sausage skein with the aid of displacement elements, wherein the sausages are then closed with clips. Even though not illustrated in the figures, the device can furthermore have a transport device, e.g. oppositely located transport rollers or conveyors which move the filled sausage skein or the single portions in the transport direction T.

According to a preferred method a lubricant is injected between the filling tube 2 and the casing material. The lubricant can also have solidifying properties so that the sausage casing to be produced hardens from the outside and inside. Here, the lubricant can either be applied to the ejected paste mass together with the sausage casing to be produced in the transport direction T, i.e. between the paste mass and the sausage casing 20, or retained via a suitable device in the end section of the filling tube 2 and returned so that no lubricant or only very little lubricant remains between the sausage casing and the paste mass.

At the start of production, i.e. before the production of the first portion, the casing material extruded over the filling tube is carefully pulled off manually and manually threaded through the following assemblies. The products from the start of production are optionally ejected from the production line before further processing.

The invention claimed is:

1. Device for the manufacture of sausages from a paste mass, in particular sausage meat, comprising a coextrusion head for coextruding the paste mass and a casing material for the sausage casing, the coextrusion head having a filling tube for the ejection of the paste mass and an extrusion die assigned to the filling tube, the extrusion die having an extrusion gap for ejecting the casing material, the filling tube protruding beyond the annular gap by a distance X such that the casing material is extruded through the annular gap onto the filling tube and can solidify along the filling tube, and a device for feeding fixing solution onto the ejected casing material, the feeding device being at least arranged in a partial region of the distance X.

2. Device according to claim 1, wherein the distance X is in the range between about 10-200 mm.

3. Device according to claim 1, wherein the surface of the filling tube has at least in the region of the distance X a low sliding friction coefficient $\mu$ which is lower than that of polished stainless steel.

4. Device according to claim 1, and a lubricating device for feeding a lubricant between the filling tube and the ejected casing material.

5. Device according to claim 4, wherein the lubricating device comprises a feed for the lubricant, which is arranged in the filling tube, as well as an annular gap through which the lubricant is ejected onto the surface of the filling tube protruding by the distance X.

6. Device according to claim 4, wherein in the end section of the filling tube at least one opening of a return channel is provided for the lubricant.

7. Device according to claim 1, wherein in the region of the filling tube end an annular stripping element is arranged around the filling tube which exerts a pressure on the sausage casing.

8. Device according to claim 1, wherein the device is arranged at the start of the distance X.

9. Device according to claim 1, wherein the distance X is greater than 200 mm.

10. Method for the manufacture of sausages comprising the following steps:
   producing a continuous sausage casing, in which casing material is extruded onto a filling tube and is moved by a certain distance X in the direction of the filling tube end,
   solidifying of the extruded casing material on the distance X of the filling tube, and
   ejecting of paste mass through the filling tube and filling the sausage casing with the paste mass, wherein the sausage casing is drawn off the filling tube.

11. Method according to claim 10, and dividing the filled sausage casing by one of a twist-off process or by constriction into single portions following the filling tube.

12. Method according to claim 10, and applying fixing solution externally at least in the starting region of the distance X onto the extruded casing material to solidify the extruded casing material.

13. Method according to claim 10, and introducing lubricant between the filling tube and the ejected casing material.

14. Method according to claim 13, wherein the lubricant exhibits solidifying properties.

15. Method according to claim 13, wherein the lubricant is introduced between the sausage casing and the paste mass.

16. Method according to claim 13, wherein the lubricant is drawn off in the end section of the filling tube such that no lubricant is introduced between the sausage casing and the paste mass.

17. Device for the manufacture of sausages from a paste mass, in particular sausage meat, comprising a coextrusion head for coextruding the paste mass and a casing material for the sausage casing, the coextrusion head having a filling tube for the ejection of the paste mass and an extrusion die assigned to the filling tube, the extrusion die having an extrusion gap for ejecting the casing material, the filling tube protruding beyond the annular gap by a distance X such that the casing material is extruded through the annular gap onto the filling tube and can solidify along the filling tube, a lubricating device for feeding a lubricant between the filling tube and the ejected casing material, and at least one opening of a return channel formed in the end section of the filling tube is provided for lubricant.

18. Method for the manufacture of sausages comprising the following steps:
   producing a continuous sausage casing, in which casing material is extruded onto a filling tube and is moved by a certain distance X in the direction of the filling tube end,
   solidifying of the extruded casing material on the distance X of the filling tube,
   ejecting of paste mass through the filling tube and filling the sausage casing with the paste mass, wherein the sausage casing is drawn off the filling tube,
   introducing lubricant between the filling tube and the ejected casing material, and
   providing, in the end section of the filling tube, at least one opening of a return channel for the lubricant.

\* \* \* \* \*

UNITED STATES PATENT AND TRADEMARK OFFICE
CERTIFICATE OF CORRECTION

PATENT NO. : 7,591,717 B2  Page 1 of 1
APPLICATION NO. : 12/147152
DATED : September 22, 2009
INVENTOR(S) : Manfred Bachtle et al.

It is certified that error appears in the above-identified patent and that said Letters Patent is hereby corrected as shown below:

On the Title Page:

At field (73), "Maschinenf Abrik" should be -- Maschinenfabrik --.

At field (57), line 6, "easing" should be -- casing --.

Signed and Sealed this

Eleventh Day of May, 2010

David J. Kappos
*Director of the United States Patent and Trademark Office*